United States Patent
Hospodor et al.

(10) Patent No.: US 6,603,625 B1
(45) Date of Patent: Aug. 5, 2003

(54) SPINDLE SYNCHRONIZING A PLURALITY OF SPINDLES CONNECTED TO A MULTI-DIMENSIONAL COMPUTER NETWORK

(75) Inventors: Andrew D. Hospodor, Los Gatos, CA (US); Christopher L. Hamlin, Los Gatos, CA (US)

(73) Assignee: Western Digital Technologies, Inc., Lake Forest, CA (US)

(*) Notice: Subject to any disclaimer, the term of this patent is extended or adjusted under 35 U.S.C. 154(b) by 440 days.

(21) Appl. No.: 09/659,158

(22) Filed: Sep. 11, 2000

(51) Int. Cl.$^7$ ............................................. G11B 15/46
(52) U.S. Cl. ................... 360/73.02; 360/73.03; 711/112
(58) Field of Search ................ 360/73.03, 73.02; 707/10; 711/112, 114

(56) References Cited

U.S. PATENT DOCUMENTS

| | | | |
|---|---|---|---|
| 4,843,288 A | * 6/1989 | Volz et al. .................. 318/599 |
| 4,891,751 A | * 1/1990 | Call et al. ...................... 712/6 |
| 4,907,105 A | * 3/1990 | Kurzweil, Jr. ............. 360/73.02 |
| 5,159,503 A | * 10/1992 | Mitamura et al. ........ 360/73.02 |
| 5,237,466 A | * 8/1993 | Glaser et al. ............ 360/73.03 |
| 5,297,262 A | 3/1994 | Cox et al. |
| 5,438,464 A | * 8/1995 | Lewis et al. ............. 360/73.03 |
| 5,517,662 A | * 5/1996 | Coleman et al. ............ 709/201 |
| 5,796,540 A | * 8/1998 | Jones et al. .............. 360/73.02 |
| 5,832,486 A | * 11/1998 | Itoh et al. ...................... 707/10 |
| 5,838,891 A | * 11/1998 | Mizuno et al. ................. 714/5 |
| 5,841,604 A | 11/1998 | Supino |
| 5,926,649 A | * 7/1999 | Ma et al. ....................... 710/6 |
| 5,961,613 A | * 10/1999 | DeNicola ..................... 710/18 |
| 6,018,790 A | * 1/2000 | Itoh et al. .................... 711/114 |
| 6,118,612 A | * 9/2000 | Judd et al. ............... 360/73.03 |
| 6,134,068 A | * 10/2000 | Donaldson ............... 360/73.02 |
| 6,148,414 A | * 11/2000 | Brown et al. ................... 714/9 |
| 6,272,662 B1 | * 8/2001 | Jadav et al. ................. 714/805 |
| 6,370,145 B1 | * 4/2002 | Dally et al. ................. 370/400 |
| 2002/0007438 A1 | * 1/2002 | Lee ............................. 711/114 |

OTHER PUBLICATIONS

Aaron Brown, "The UC Berkeley ISTORE Project: Bringing Availability, Maintainability, and Evolutionary Growth to Storage–Based Clusters", http://iram.CS.Berkeley.EDU/istore/talks/lucent–jan00/sld001.htm, Jan. 19th, 2000.

* cited by examiner

*Primary Examiner*—Hong Kim
(74) *Attorney, Agent, or Firm*—Milad G. Shara, Esq.; Howard H. Sheerin, Esq.

(57) ABSTRACT

A multi-dimensional computer network is disclosed comprising a multi-dimensional network controller for interconnecting a plurality of computer devices, including a plurality of disk drives, communicating via a network protocol through a plurality of nodes, each node comprising more than two bi-directional ports for simultaneously transmitting data in multiple dimensions through the multi-dimensional computer network. At least one of the disk drives comprises a disk for storing data and an index mark, a spindle motor for rotating the disk, a head for reading the data and the index mark stored on the disk, an index mark detector for generating an index mark detect signal in response to the head reading the index mark, an interface for receiving a spindle sync signal from the multi-dimensional network controller through the network protocol, and a spindle synchronization circuit, responsive to the index mark detect signal, for synchronizing the rotation of the disk to the spindle sync signal. A switched fabric computer network is also disclosed comprising a plurality of interconnected switched nodes, wherein at least on of the switched nodes comprises a disk, a head, multi-port switching circuitry, and a spindle synchronization circuit for synchronizing the rotation of the disk relative to a spindle sync message.

10 Claims, 8 Drawing Sheets

SPINDLE SYNCHRONIZING A PLURALITY OF SPINDLES CONNECTED TO A MULTI-DIMENSIONAL COMPUTER NETWORK

BACKGROUND OF THE INVENTION

1. Field of the Invention

The present invention relates to multi-dimensional computer networks. More particularly, the present invention relates to spindle synchronizing a plurality of spindles connected to a multi-dimensional computer network.

2. Description of the Prior Art

Disk storage systems may be accessible through a computer network; for example, they may be accessed indirectly through a server connected to the network, or they may be accessed directly as a network attached storage device. A disk storage system connected to a computer network may comprise a single spindle with multiple disks, or it may comprise an array of spindles in a conventional configuration referred to as Redundant Array of Independent Disks, or RAID.

A RAID storage system typically comprises a plurality of spindles which are accessed simultaneously in order to implement well known operations such as data striping (simultaneously writing multiple data blocks to multiple disks to increase throughput) or data mirroring (simultaneously writing a single data block to multiple disks to enhance data security). To facilitate simultaneous access to multiple disks located on separate spindles, the spindles of a RAID storage system are typically synchronized (frequency and phase locked). This is typically implemented by synchronizing the spindles to a synchronization signal generated relative to an index mark recorded on at least one disk of each spindle. The synchronization signal is typically communicated to all of the spindles over a common wire, for example, through a backplane bus in a rack of spindles.

Figure 1A:
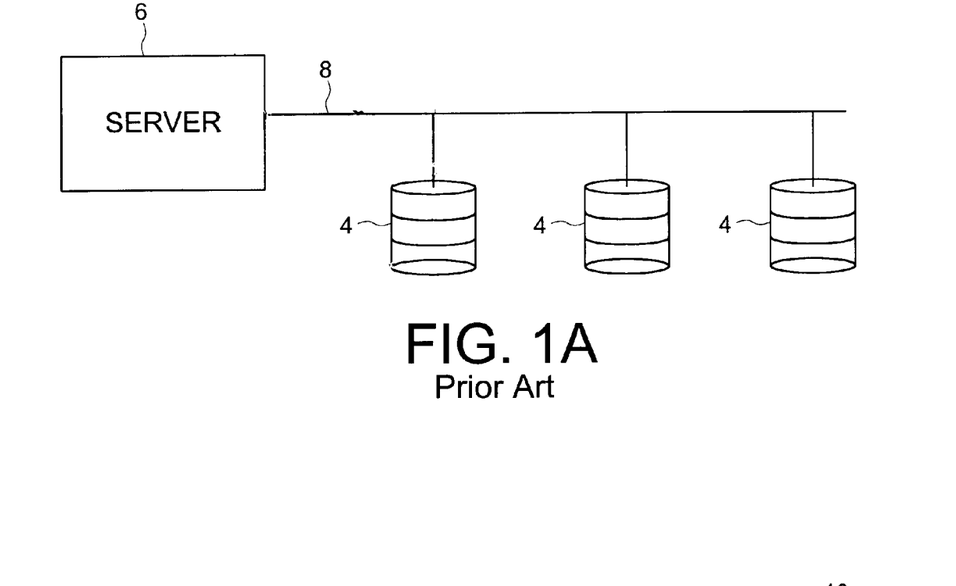
FIG. 1A shows a one-dimensional SCSI network wherein a plurality of computer devices shares a common transmission medium through arbitration.

There have been attempts to communicate the synchronization signal to all of the spindles using a network protocol, such as the SCSI network protocol. As illustrated in FIG. 1A, a SCSI network 2 is typically a one-dimensional network comprising a plurality of computer devices, such as a plurality of disk drives 4, which communicate with each other and to a server 6 over a shared transmission medium 8. An arbitration strategy is employed to determine the mastership of the shared transmission medium 8 to resolve access conflicts.

Figure 1B:
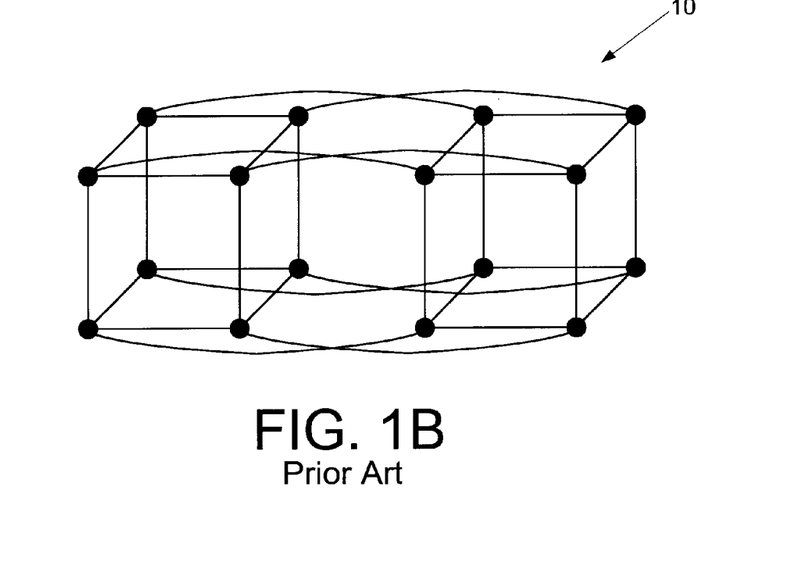
FIG. 1B shows a multi-dimensional computer network where each node comprises four ports to form a 2-ary, 4-cube multi-dimensional computer network (otherwise known as a hypercube).

When attempting to spindle synchronize a plurality of disk drives, the latency associated with the network communication protocol, including arbitration latency, can induce an unacceptable amount of jitter in the synchronization signal leading to unacceptable performance. This jitter problem is magnified in multi-dimensional computer networks, such as in k-ary n-cube networks, where interconnecting and routing information between hundreds or even thousands of disk drives is significantly more complex than in a one-dimensional SCSI network comprising only a few disk drives. An example of a multi-dimensional computer network 10 is illustrated in FIG. 1B which shows that each node comprises more than two bi-directional ports which facilitates communication in multiple dimensions. Each node in the example of FIG. 1B comprises four bi-directional ports, where each port connects to another node to form a 2-ary, 4-cube multidimensional computer network 10.

There is a need to spindle synchronize a plurality of disk drives connected to a multi-dimensional computer network by communicating a synchronization signal to each disk drive in a manner that does not result in excessive jitter.

SUMMARY OF THE INVENTION

The present invention may be regarded as a multi-dimensional computer network comprising a multi-dimensional network controller for interconnecting a plurality of computer devices, including a plurality of disk drives, communicating via a network protocol through a plurality of nodes, each node comprising more than two bi-directional ports for simultaneously transmitting data in multiple dimensions through the multi-dimensional computer network. At least one of the disk drives comprises a disk for storing data and an index mark, a spindle motor for rotating the disk, a head for reading the data and the index mark stored on the disk, an index mark detector for generating an index mark detect signal in response to the head reading the index mark, an interface for receiving a spindle sync signal from the multi-dimensional network controller through the network protocol, and a spindle synchronization circuit, responsive to the index mark detect signal, for synchronizing the rotation of the disk to the spindle sync signal.

In one embodiment, at least one of the plurality of disk drives transmits an index mark detected message to the multi-dimensional network controller in response to the head reading the index mark, and the multi-dimensional network controller generates the spindle sync signal from the index mark detected message.

In another embodiment, the interface in the at least one of the plurality of disk drives comprises isochronous circuitry for isochronously receiving the spindle sync signal from the multi-dimensional network controller.

In still another embodiment, the spindle sync signal is generated from an external source, such as a clock generator or crystal.

In yet another embodiment, the rotation of the disk in each disk drive is synchronized according to a predetermined phase offset in order to minimize the rotational latency in a mirrored storage system.

The present invention may also be regarded as a multi-dimensional computer network comprising a plurality of interconnected switched nodes. At least one of the switched nodes comprises a disk for storing data and an index mark, a spindle motor for rotating the disk, a head for reading the data and the index mark stored on the disk, an index mark detector for generating an index mark detect signal in response to the head reading the index mark, more than two input ports and more than two output ports for connecting to other switched nodes and for simultaneously transmitting data in multiple dimensions through the multi-dimensional computer network, wherein at least one of the input ports for receiving a spindle sync message from another of the switched nodes, a data buffer for buffering message data received through the plurality of input ports from other switched nodes, routing circuitry for routing the message packets to selected output ports, and a spindle synchronization circuit, responsive to the index mark detect signal, for synchronizing the rotation of the disk relative to the spindle sync message.

In one embodiment, one of the plurality of switched nodes is a master switched node for generating the spindle sync message, and the master switched node multicasts the spindle sync message to the other switched nodes.

In another embodiment, the spindle sync message is generated from an external source, such as a clock generator or crystal.

In another embodiment, the at least one switched node comprises isochronous circuitry for receiving the spindle sync message isochronously and for transmitting the spindle sync message to another switched node isochronously.

In yet another embodiment, the rotation of the disk in each switched node is synchronized according to a predetermined phase offset in order to minimize the rotational latency in a mirrored storage system.

DESCRIPTION OF THE PREFERRED EMBODIMENTS

Figure 2:
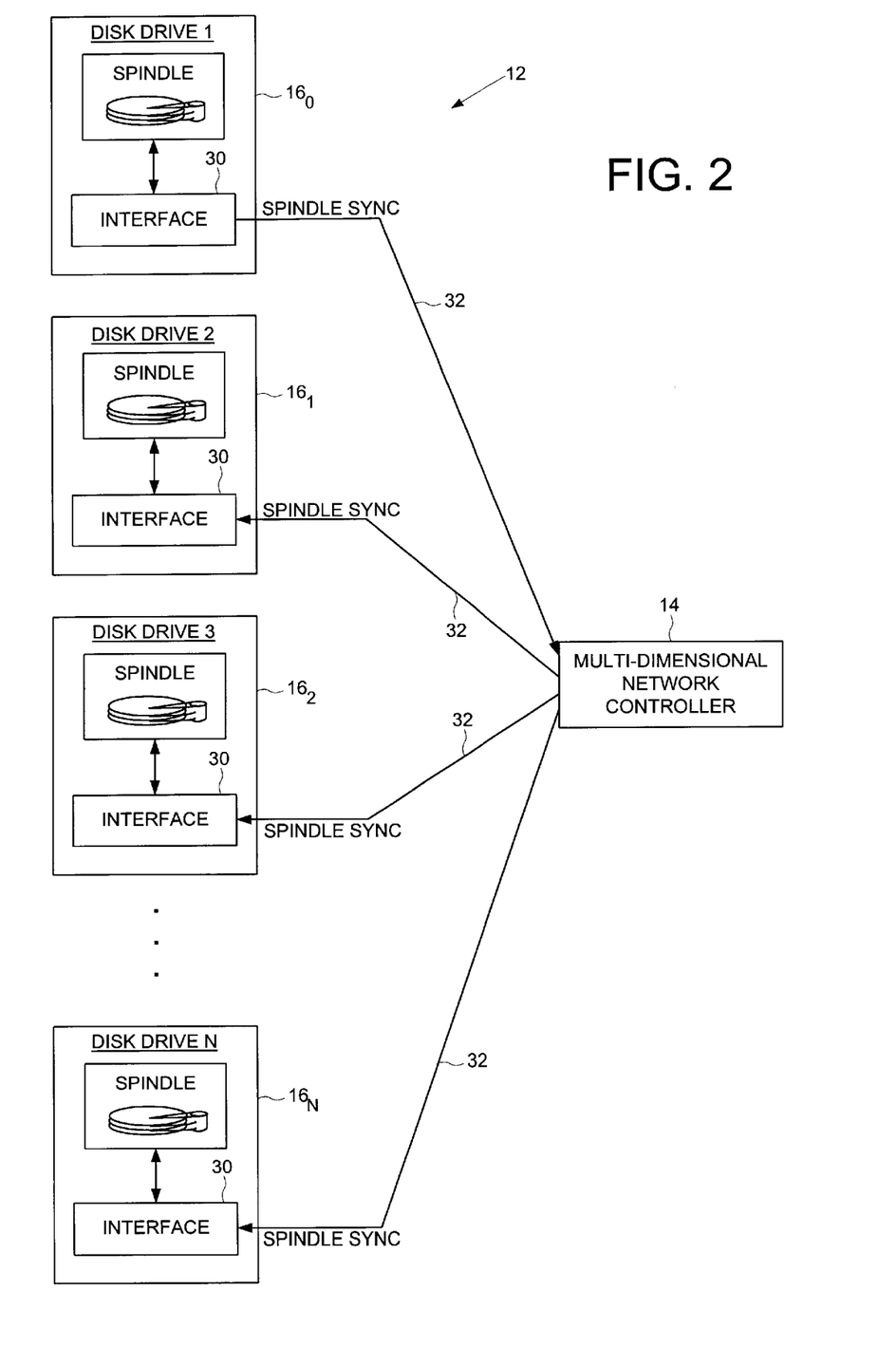
FIG. 2 shows a multi-dimensional computer network according to an embodiment of the present invention comprising a plurality of disk drives which are spindle synchronized to a master disk drive through a multi-dimensional network controller and a network communication protocol.
Figure 3A:
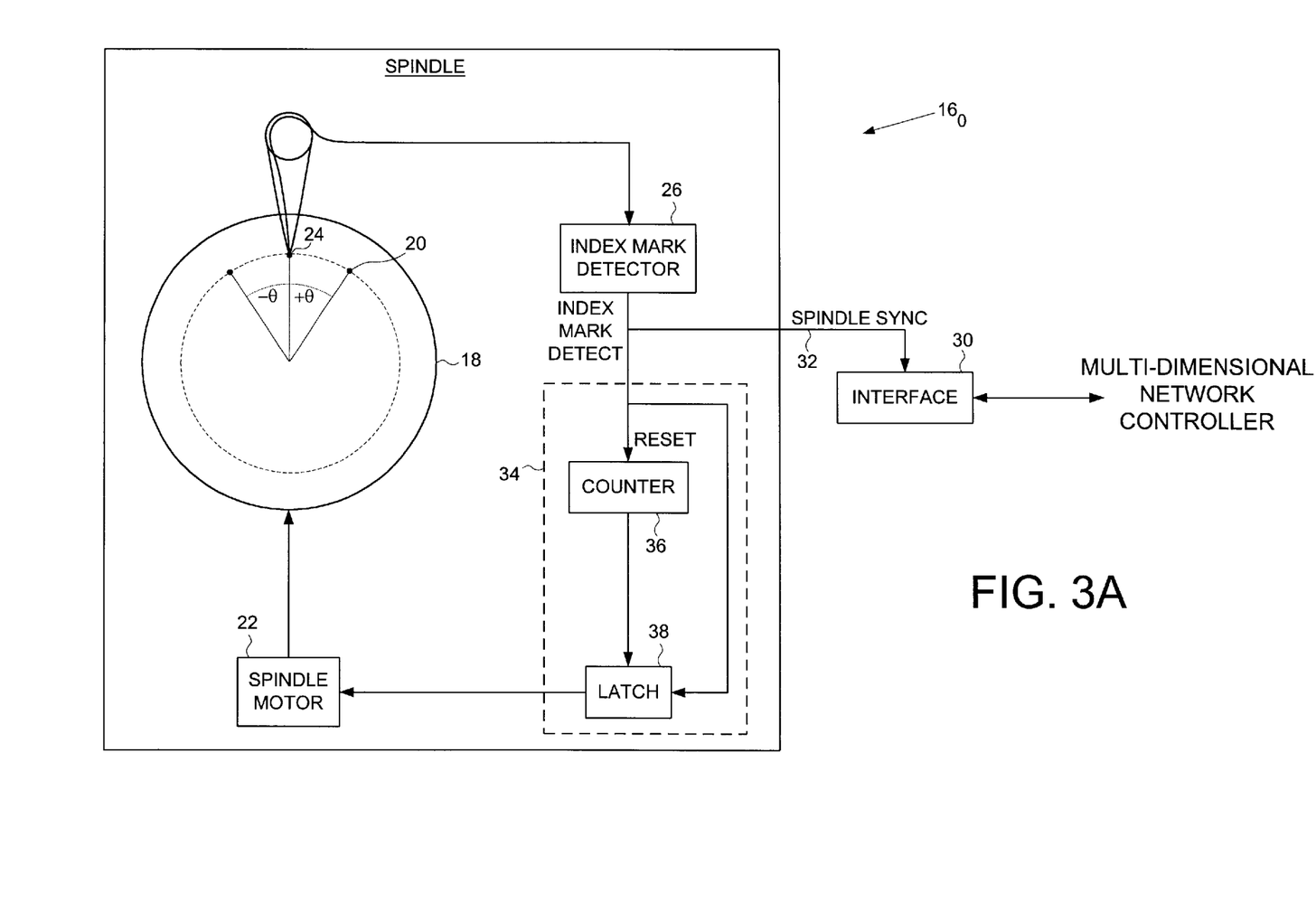
FIG. 3A shows details of the master disk drive of FIG. 2 for generating a master spindle sync signal transmitted to the multi-dimensional network controller.
Figure 3B:
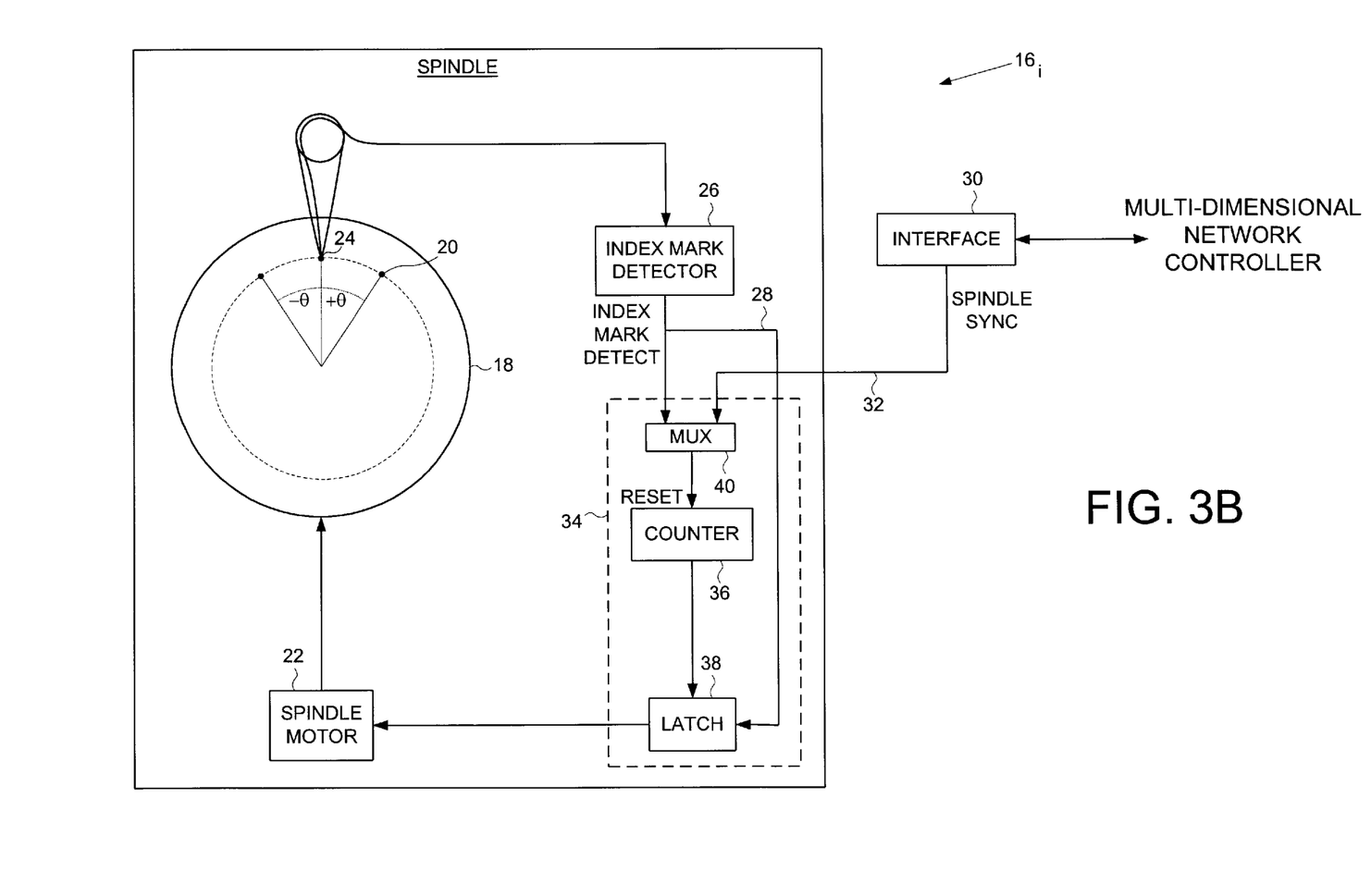
FIG. 3B shows details of a slave disk drive of FIG. 2 comprising an interface for receiving the spindle sync signal from the multi-dimensional network controller and spindle synchronization circuitry for synchronizing the rotation of a disk to the spindle sync signal.

FIG. 2 shows a multi-dimensional computer network 12 according to an embodiment of the present invention comprising a multi-dimensional network controller 14 for interconnecting a plurality of computer devices, including a plurality of disk drives $16_0$–$16_N$, communicating via a network protocol through a plurality of nodes, each node comprising more than two bi-directional ports (e.g., the 2-ary, 4-cube of FIG. 1B) for simultaneously transmitting data in multiple dimensions through the multi-dimensional computer network. As illustrated in FIG. 3B, at least one of the disk drives $16_i$ comprises a disk 18 for storing data and an index mark 20, a spindle motor 22 for rotating the disk 18, a head 24 for reading the data and the index mark 20 stored on the disk 18, and an index mark detector 26 for generating an index mark detect signal 28 in response to the head 24 reading the index mark 20. An interface 30 receives a spindle sync signal 32 from the multi-dimensional network controller 14 through the network protocol, and a spindle synchronization circuit 34, responsive to the index mark detect signal 28, synchronizes the rotation of the disk 18 to the spindle sync signal 32.

In one embodiment, the spindle sync signal 32 is generated by a predetermined disk drive $16_0$–$16_N$ deemed the "master" disk drive (e.g., disk drive $16_0$). This embodiment is illustrated in FIG. 3A wherein the spindle sync signal 32 is generated when the head 24 detects the index mark 20 recorded on the disk 18. The spindle sync signal 32 is communicated via the multi-dimensional network controller to the other disk drives $16_1$–$16_N$. In another embodiment, the spindle synchronization is "masterless" in that an arbitrary disk drive generates the spindle sync signal 32 (e.g., the disk drive which first detects the index mark 20).

In one embodiment, the spindle synchronization process comprises the steps of frequency locking the rotation of the disks 18 to a predetermine rotation frequency, and then phase locking the rotation of the disks 18 to the spindle sync signal 32. Referring to FIG. 3A, the spindle synchronization circuit 34 comprises a counter 36 and a latch 38. When the index mark 20 is first detected by the head 24, the counter 36 is loaded with a predetermined value corresponding to the desired rotation frequency during the frequency lock mode. The counter 36 is then decremented at a predetermined frequency until the index mark 20 is detected again after the disk 18 completes a revolution. The latch 38 latches the content of the counter 36 and the counter is reset with the predetermined value. The content of the latch 38 is then used to control the spindle motor 22 to adjust the rotation speed of the disk 18. When the rotation of the disk 18 is synchronized to the desired rotation frequency, the content of the counter 36 will be zero when the head 24 detects the index mark 20.

The phase lock mode of the spindle synchronization process is understood with reference to FIG. 3B. During frequency lock, the index mark detect signal 28 is selected via multiplexer 40 to reset the counter 36, and during phase lock, the spindle sync signal 32 is selected via multiplexer 40 to reset the counter 36. Thus during phase lock, the index mark detect signal 28 latches the counter value into latch 38 relative to the spindle sync signal 32. When the rotation of the disk 18 is phase locked to the sync mark signal 32, the counter value latched into the latch 38 will be zero. Once phase locked, the rotation of the disks 18 will be frequency and phase synchronized such that the index mark 20 in all of the disk drives $16_0$–$16_N$ will be detected at the same time which enables simultaneous access for such applications as data striping or data mirroring.

In still another embodiment, the spindle sync signal is generated from an external source, such as a clock generator or crystal. The external source may be integrated into the network controller 14 (e.g., a crystal in the network controller), or it may be a source external to the network, such as a clock signal communicated wirelessly to the network controller 14.

Figure 4:
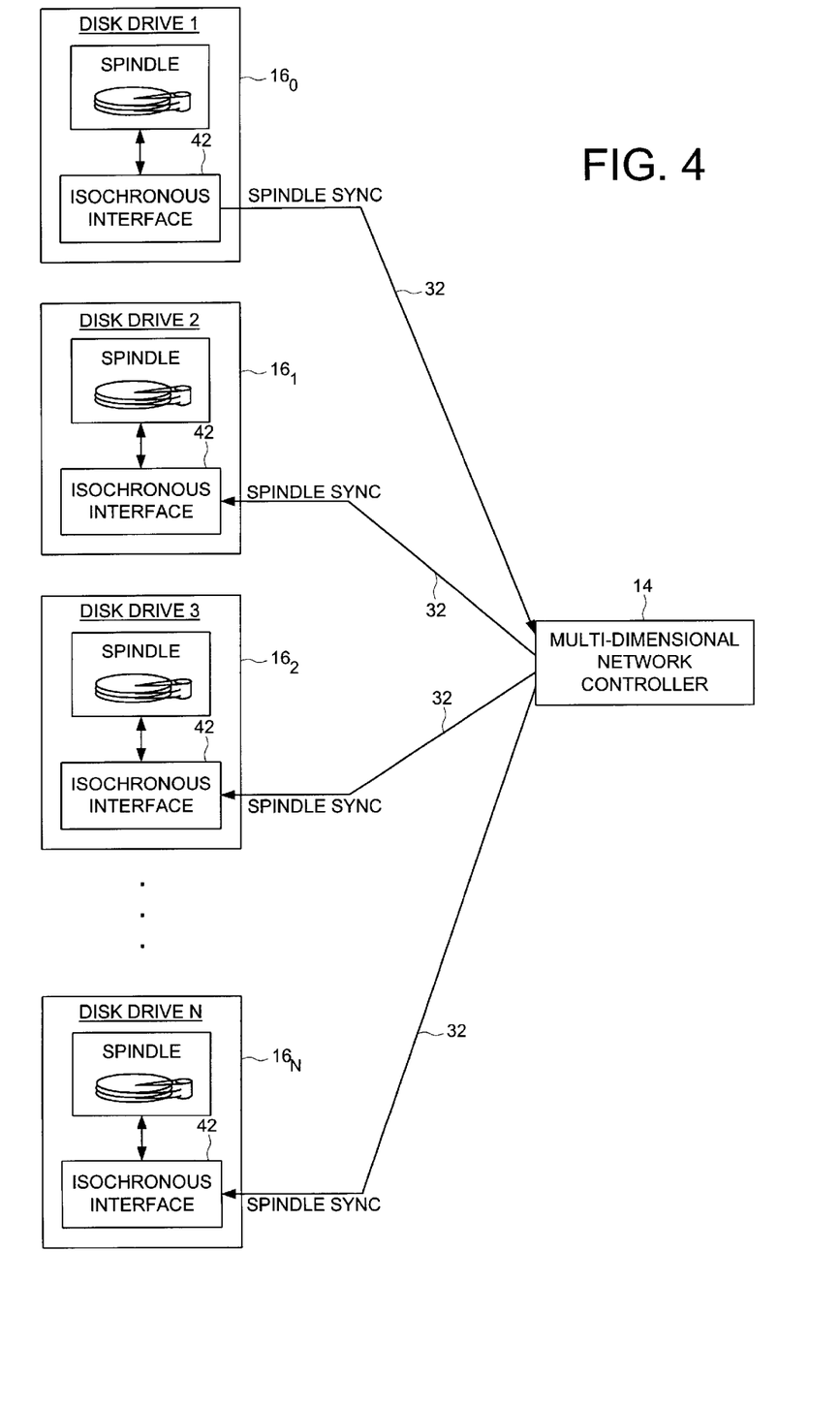
FIG. 4 shows a multi-dimensional computer network according to an embodiment of the present invention comprising a plurality of disk drives, where each disk drive communicates with a multi-dimensional network controller through an isochronous interface.

FIG. 4 shows an embodiment of the present invention wherein each of the disk drives $16_0$–$16_N$ comprises an isochronous interface 42. The "master" disk drive 160 transmits the spindle sync signal 32 isochronously to the multi-dimensional network controller 14 which is then transmitted isochronously to the other disk drives $16_1$–$16_N$. The isochronous transfer guarantees 12 that the spindle sync signal 32 will arrive at the multi-dimensional network controller 14 as well as the other disk drives $16_1$–$16_N$ at a predetermined period, thereby fixing the latency and minimizing jitter in the spindle sync signal 32. In one embodiment, the counter value latched into latch 38 of FIG. 3B is adjusted to account for the transfer latency of the spindle sync signal 32. Suitable circuitry for implementing an isochronous protocol is disclosed in Texas Instruments' TSB12LV41A link-layer controller (LLC) which supports the IEEE 1394 specification for high-performance serial bus with automatic generation of the common isochronous packet headers and time stamping as required by the IEC 61883 standard.

Figures 5, 6:
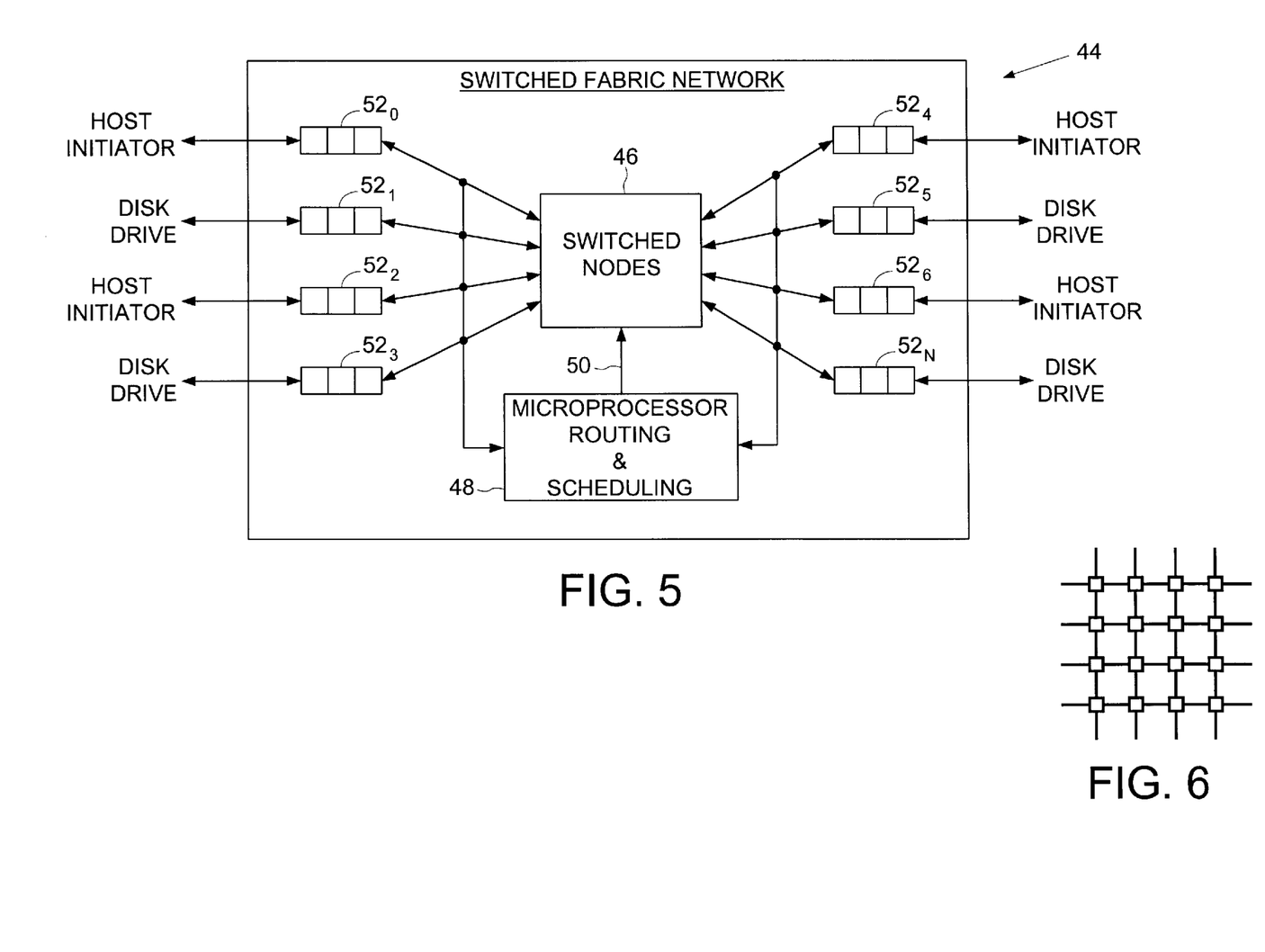
FIG. 5 shows an embodiment of the present invention wherein the multi-dimensional computer network is implemented as a switched fabric network comprising a plurality of switched nodes and a microprocessor for implementing a routing and scheduling algorithm.
FIG. 6 shows a topology for the switched nodes of FIG. 5 as a two dimensional switched fabric where each node comprises four bi-directional ports for simultaneously transmitting data in multiple dimensions through the switched fabric network.

FIG. 5 shows a multi-dimensional computer network according to an embodiment of the present invention as a switched fabric network 44 comprising a plurality of switched nodes 46 and a microprocessor 48 for executing a routing and scheduling algorithm for servicing requests received from host initiators at the edge of the switched nodes 46. The switched fabric network 44 further comprises buffers $52_0$–$52_N$ for buffering the requests at the edge of the switched nodes 46, and the switched nodes 46 comprise a plurality of multi-port switches for routing the requests in multiple dimensions. In one embodiment, the requests consist of packets having a packet header comprising routing data which identifies the source node for the packet. The microprocessor 48 processes the packet header in order to route the packet through the switched nodes 46. A suitable routing algorithm implemented by the microprocessor 48 generates control data 50 for configuring the multi-port switches within the switched nodes 46. Any suitable routing algorithm may be implemented by the switched fabric network 44, and it may support Unicast, Multicast, or Broadcast delivery mechanisms. The routing decisions may be made centrally, at the source, distributed, or multiphase, implemented using a lookup table or using a finite-state machine. Further, the routing algorithm may be deterministic or adaptive. A discussion of various routing algorithms which may be employed in the embodiments of the present invention is provided by Jose Duato et al. in the text book "Interconnection Networks, an Engineering Approach", IEEE Computer Society, 1997.

The routing algorithm is implemented a layer "above" the switching layer, and thus the routing algorithm may be compatible with various different switching algorithms, for example, Virtual Cut-Through Switching, Wormhole Switching, and Mad Postman Switching. FIG. 6 illustrates an example topology for the switched nodes 46 as a two dimensional switched fabric where each node comprises four bi-directional ports (North, South, East and West) for simultaneously transmitting data in two dimensions. Other topologies may be employed in the present invention by decreasing or increasing the number of bidirectional ports per node. Various topologies and switching algorithms which may be employed in the embodiments of the present invention are discussed in the aforementioned text book by Jose Duato et al.

The switched fabric network 44 of FIG. 5 has a plurality of disk drives connected to the edge of the switched nodes 46 which in one embodiment are spindle synchronized according to the aspects of the present invention. In another embodiment shown in FIG. 7, switched nodes $54_0$–$54_2$ comprise a spindle 56 comprising a disk and a head for implementing a distributed network storage system. One of the switched nodes (e.g., $54_0$) generates the spindle sync signal 32 which is communicated to the microprocessor 48 of FIG. 5. The microprocessor 48 then routes the spindle sync signal 32 to the other switched nodes (e.g., $54_1$–$54_2$) in order to spindle synchronize the spindles 56. In an alternative embodiment, the routing algorithm is distributed among the switched nodes and the sync signal is multicast to the switched nodes from a master switched node rather than routing the sync signal through a central network microprocessor 48.

Figure 7:
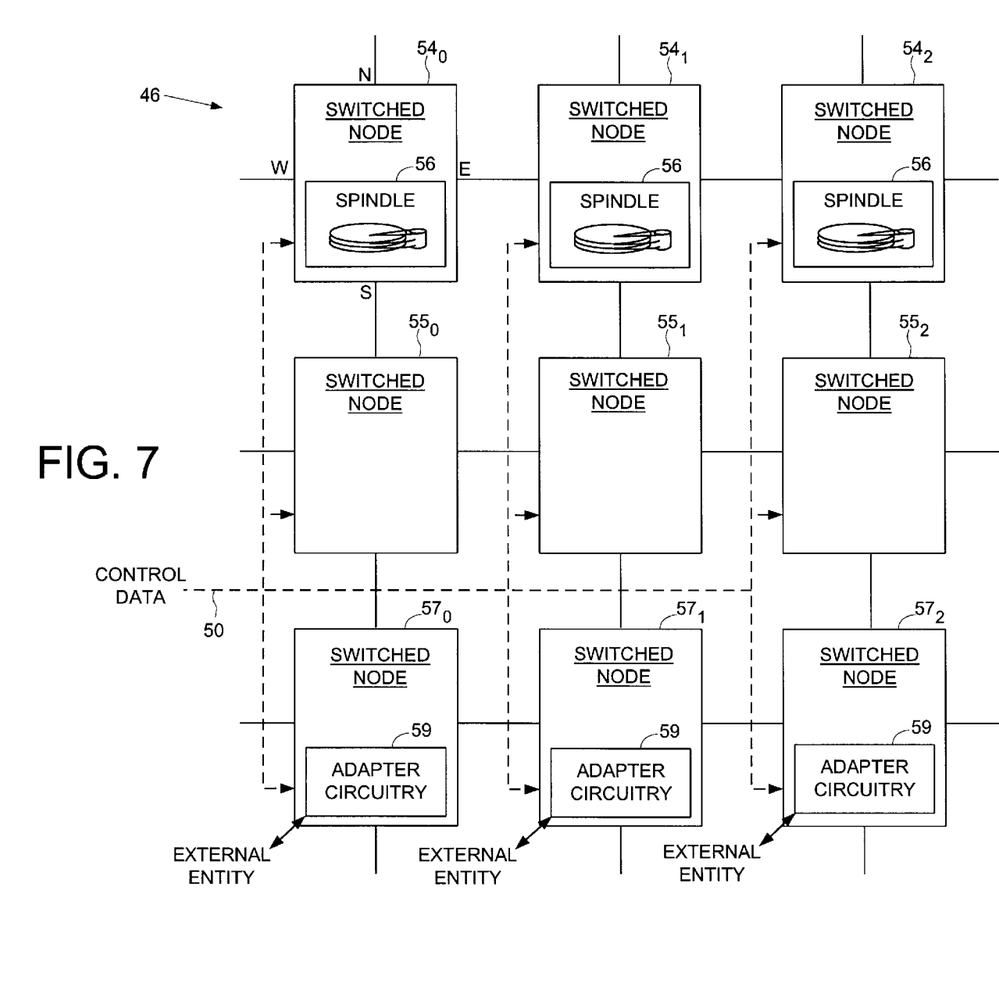
FIG. 7 shows an embodiment of the present invention wherein a selected number of the switched nodes in the switched fabric of FIG. 6 comprise a spindle for storage.
Figure 8:
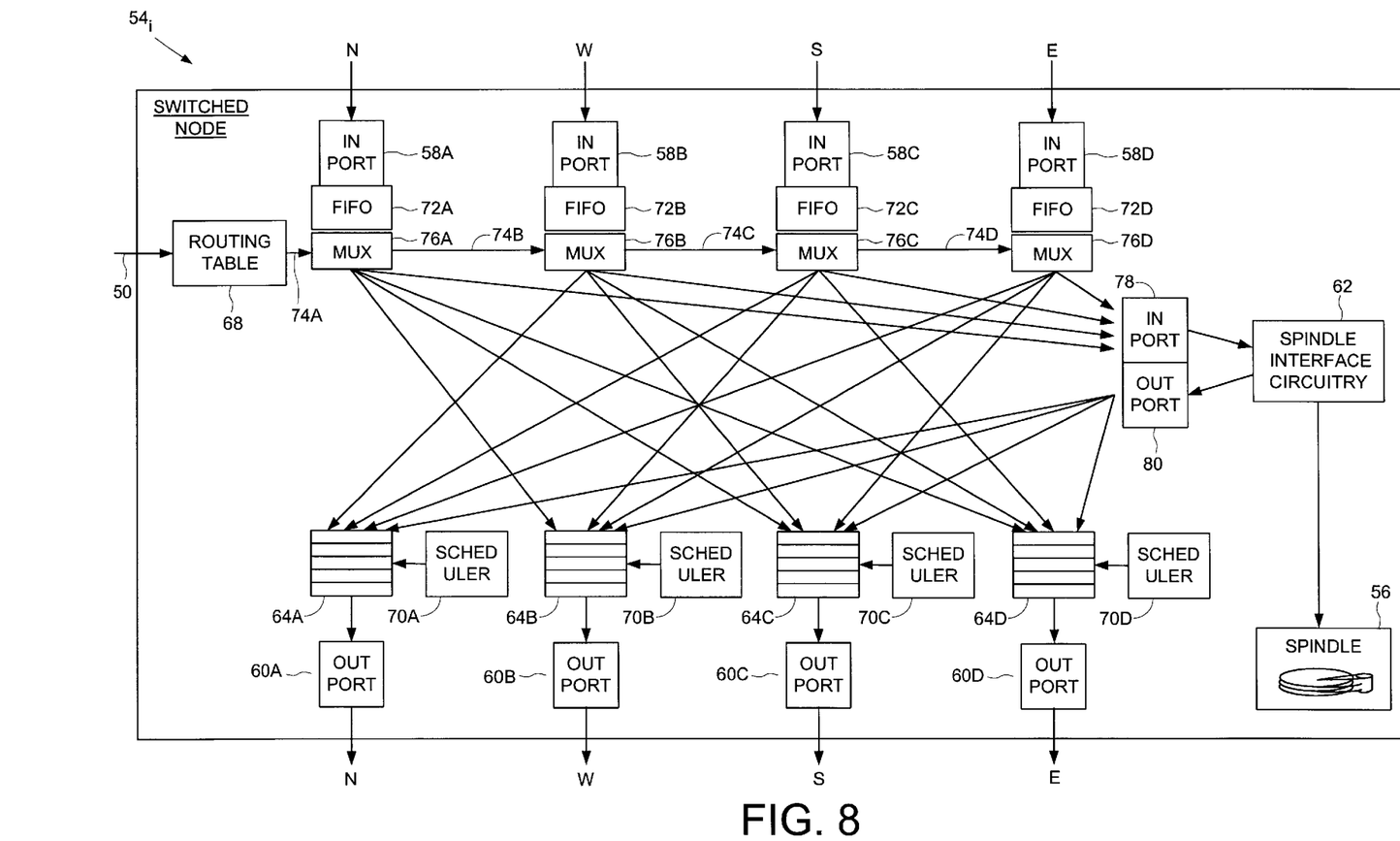
FIG. 8 shows details of a switched node comprising a spindle, as in the switched fabric of FIG. 7.

In the embodiment shown in FIG. 7, the switched nodes 46 constituting the switched fabric may or may not comprise a spindle 56. In addition, a select number of the switched nodes 46 comprise adapter circuitry 59 for connecting to an external entity (e.g., a host initiator or disk drive in FIG. 5). In the example of FIG. 7, switched nodes $54_0$–$54_2$ comprise a spindle 56 as shown in FIG. 8, switched nodes $55_0$–$55_2$ comprise the circuitry shown in FIG. 8 without the spindle 56, and switched nodes $57_0$–$57_2$ comprise adapter circuitry 59 for connecting to an external entity and may or may not comprise a spindle 56. In another embodiment, a selected number of the switched nodes (e.g., $55_0$–$55_2$) comprise a microprocessor for implementing a distributed routing algorithm.

FIG. 8 shows details for one of the switched nodes $54_i$ of FIG. 7 comprising a spindle 56 and more than two bi-directional ports for simultaneously transmitting data in multiple dimensions through the switched fabric network, each port comprising an input port 58A–58D and an output port 60A–60D. Spindle interface circuitry 62 interfaces with the spindle 56, and data buffers 64A–64D store data received from the input ports 58A–58D as well as data received from the spindle 56 via the spindle interface circuitry 62. Routing circuitry, responsive to header data in data packets received from the input ports 58A–58D and header data in data packets received from the spindle interface circuitry 62, routes data to selected output ports 60A–60D and to the spindle interface circuitry 62.

In the embodiment of FIG. 8, the routing circuitry comprises a routing table 68 and a scheduling facility 70A–70D. Data packets received from the input ports 58A–58D are buffered in FIFO buffers 72A–72D. The routing table 68 is configured by the control data 50 generated by the microprocessor 48 of FIG. 5. The routing table 68 generates control signals 74A–74D which configure multiplexers 76A–76D in order to route the data packets to the appropriate data buffers 64A–64D associated with the output ports 60A–60D. In this manner, the data packets cross the switched node $54_i$ immediately except for the delay of the FIFO buffer 72A–72D. The FIFO buffers 72A–72D provide buffering of input data in the event that the target data buffer 64 is full or busy receiving data from another of the input ports.

The data packets may also be routed to an input port 78 associated with the spindle 56 and processed by the spindle interface circuitry 62 to write the data packets onto the disk within the spindle 56. Data read from the disk in the spindle 56 is also processed by the spindle interface circuitry 62 and transmitted via output port 80 to the appropriate data buffer 64A–64D.

The scheduling facility 70A–70D schedules the time when the data packets are to be transferred from the data buffers 64A–64D to the output ports 60A–60D. In one embodiment, the timing information for the packets are stored in the packet headers and processed by the scheduling facility 70A–70D. In one embodiment, the timing information implements an isochronous communication protocol such as disclosed in the in Texas Instruments' TSB12LV41A link-layer controller (LLC) which supports the IEEE 1394 specification for high-performance serial bus with automatic generation of the common isochronous packet headers and time stamping as required by the IEC 61883 standard. The spindle sync signal 32 is communicated isochronously from one of the switched nodes (e.g., $54_0$) to the microprocessor 48 of FIG. 5, and from the microprocessor 48 to the other switched nodes (e.g., $54_1$–$54_2$) of the switched fabric as described above with reference to FIG. 4.

In one embodiment, the data buffers 64A–64D comprise a plurality of virtual lanes where each virtual lane is assigned a predetermined priority level. The scheduling facility 70A–70D schedules the data packets according to the timing information by queuing the data packets in the appropriate virtual lanes. For example, data packets with shorter transmission deadlines are queued in higher priority virtual lanes, whereas data packets with longer transmission deadlines are queued in lower priority virtual lanes.

In another embodiment, the switched nodes $54_0$–$54_2$ comprise an arbitration facility for arbitrating the transmission of the message data through the output ports 60A–60D based on a predetermined priority. The message data associated with the spindle sync signal 32 is given higher priority than host initiator data so as to prevent the host initiator data from interfering with the spindle synchronization operation. In one embodiment, the arbitration facility comprises a plurality of virtual lanes implemented within the data buffers 64A–64D, where each virtual lane is assigned a predetermined priority. The message data associated with the spindle sync signal 32 is transmitted through a virtual lane having higher priority than the virtual lanes used to transmit host initiator data.

In yet another embodiment, a primary switching protocol is used to transmit the host initiator data, and a secondary communication protocol is used to transmit the spindle sync signal 32. For example, the primary communication protocol may implement an asynchronous protocol for communicating host initiator data, and the secondary communication protocol may implement an isochronous protocol for communicating the spindle sync signal 32. In another embodiment, different switching techniques may be employed to implement the dual level protocol. For example, the primary communication protocol may implement wormhole switching in order to communicate long packets associated with host initiator data more efficiently, whereas the secondary communication protocol may implement packet switching in order to communicate short packets associated with the spindle sync signal 32 more efficiently. With packet switching, packets are buffered completely within each node before being transferred to the next node which is why this type of switching is referred to as store-and-forward packet switching. With wormhole switching, packets are transmitted immediately to the next node so that packets are actually spread across several nodes. Packet switching ensures a predictable consumption of link and buffer resources which is necessary to support an isochronous communication protocol, whereas wormhole switching reduces the latency and buffer requirements needed to transfer the typically longer packets associated with host initiator data.

In still another embodiment, the spindles in the disk drives $16_0$–$16_N$ or the switched nodes $54_0$–$54_2$ are spindle synchronized to have a predetermined phase offset relative to one another in order to reduce the rotational latency in accessing a mirrored data block. The disk drive $16_i$ or switched node $54_i$ having the smallest phase offset from the mirrored data block relative to the head 24 is selected to service the access request. In one embodiment, spindle synchronizing with a phase offset is implemented by adding an appropriate delay to the spindle sync signal 32 transmitted to the disk drives $16_1$–$16N$ or switched nodes $54_1$–$54_2$. The delay is incrementally longer for each spindle in order to adjust the phase offset across the spindles. For example, in a mirrored storage system employing 360 spindles the delay is incremented by one degree so that the maximum rotational latency for accessing any particular data block is one degree.

We claim:

1. A multi-dimensional computer network comprising:
    a plurality of interconnected switched nodes, wherein at least one of the switched nodes comprises:
    (a) a disk for storing data and an index mark;
    (b) a spindle motor for rotating the disk;
    (c) a head for reading the data and the index mark stored on the disk;
    (d) an index mark detector for generating an index mark detect signal in response to the head reading the index mark;
    (e) more than two input ports and more than two output ports for connecting to other switched nodes and for simultaneously transmitting data in multiple dimensions through the multi-dimensional computer network, wherein at least one of the input ports for receiving a spindle sync message from another of the switched nodes;
    (f) a data buffer for buffering message data received through the plurality of input ports from other switched nodes;
    (g) routing circuitry for routing the message data to selected output ports; and
    (h) a spindle synchronization circuit, responsive to the index mark detect signal, for synchronizing the rotation of the disk relative to the spindle sync message.

2. The multi-dimensional computer network of claim 1, wherein:
    (a) one of the plurality of switched nodes is a master switched node for generating the spindle sync message; and
    (b) the master switched node multicasts the spindle sync message to the other switched nodes.

3. The multi-dimensional computer network of claim 1, wherein the spindle sync message is generated from an external source.

4. The multi-dimensional computer network of claim 1, wherein the at least one switched node comprises isochronous circuitry for receiving the spindle sync message isochronously and for transmitting the spindle sync message to another switched node isochronously.

5. The multi-dimensional computer network of claim 1, wherein:
    (a) the at least one switched node comprises arbitration circuitry for arbitrating the transmission of the message data through the output ports based on a predetermined priority; and
    (b) the message data associated with the spindle sync message is given higher priority than host initiator message data.

6. The multi-dimensional computer network of claim 5, wherein:
    (a) the arbitration circuitry comprises a plurality of virtual lanes; and
    (b) each lane is assigned a predetermined priority.

7. The multi-dimensional computer network of claim 5, wherein:
    (a) a primary communication protocol is used to transmit the host initiator data; and
    (b) a secondary communication protocol is used to transmit the spindle sync message.

8. The multi-dimensional computer network of claim 5, wherein:
    (a) the primary switching protocol is a wormhole switching protocol; and (b) the secondary switching protocol is a packet switching protocol.

9. The multi-dimensional computer network of claim 1, wherein the rotation of the disk is synchronized according to a predetermined phase offset relative to an index mark recorded on a disk of another of the switched nodes.

10. The multi-dimensional computer network of claim 9, wherein the spindle sync message comprises a predetermined delay corresponding to the predetermined phase offset.

* * * * *

UNITED STATES PATENT AND TRADEMARK OFFICE
CERTIFICATE OF CORRECTION

PATENT NO.     : 6,603,625 B1
DATED          : August 5, 2003
INVENTOR(S)    : Andrew D. Hospodor et al.

It is certified that error appears in the above-identified patent and that said Letters Patent is hereby corrected as shown below:

<u>Title page,</u>
Item [73], Assignee, delete "Western Digital Technologies, Inc., Lake Forest, CA" and replace with -- Western Digital Ventures, Inc., Lake Forest, CA (US) --.

Signed and Sealed this

Eleventh Day of April, 2006

JON W. DUDAS
*Director of the United States Patent and Trademark Office*